United States Patent Office 3,365,520
Patented Jan. 23, 1968

3,365,520
NOVEL ETHYLENE POLYMER COMPOSITIONS CONTAINING 1-OLEFIN/CARBOXYLIC ACID SALT INTERPOLYMERS
George N. Foster, Plainfield, and William Sacks, Gillette, N.J., assignors to Union Carbide Corporation, a corporation of New York
No Drawing. Filed May 27, 1965, Ser. No. 459,440
10 Claims. (Cl. 260—897)

ABSTRACT OF THE DISCLOSURE

Ethylene polymer compositions which are not susceptible to biaxial orientation alone can be made so by blending them with inorganic salts of $\alpha,\beta$-ethylenically unsaturated carboxylic acid/$\alpha$-monoolefin copolymers.

Films of these compositions are particularly useful for shrink wrapping or packaging of foodstuffs.

---

This invention relates to novel ethylene polymer compositions and more particularly to those which are susceptible to being biaxially stretched and oriented in a continuous process.

It is known that although such ethylene polymers as low density polyethylene, ethylene/acrylic acid copolymer, ethylene/vinyl acetate copolymer and the like possess many useful physical properties, as for example, tear resistance, moderate transparency, high flexibility and moderate toughness, they are difficult to stretch biaxially. Hence, these ethylene polymers exhibit poor shrink properties and their toughness and strength cannot be enhanced much beyond the levels possessed by these polymers in the unstretched state to provide superior films where these properties are enhanced in a uniform manner with respect to the principal directions in the plane of the film.

Tubular biaxially oriented low density polyethylene has heretofore not been produced commercially from polyethylene resins having densities below about 0.94 grams per cubic centimeter (gm./cc.), a melt index above 0.3 desigrams per minute (dg./min.) and an intrinsic viscosity below 1.2 deciliters per gram (dl./gm.). Tubings made from polyethylene resins having melt indices below 0.3 dg./min. and intrinsic viscosities above 1.2 dl./gm. have been biaxially oriented by the prior art method of passing the tubing, containing an isolated "bubble," through a single-stack radiant heater and radially expanding the tubing at the draw point. However, the expansion ratios were only controlled within narrow limits and only thin film of thicknesses less than 1 mil, such as 0.5 mil, were produced. For packaging of certain foodstuffs, such as turkeys, it is required that the oriented film have a thickness of about 1.5 mils or greater for greater strength, mechanical durability and puncture resistance. Also high shrinkage with accompanying high shrink force at 90° C is required to yield a package that will adequately protect the contents during storage, particularly at low temperatures. It should be noted that low density polyethylene, if irradiated, can be and has been biaxially oriented, but this is not a completely satisfactory solution for the irradiated material is relatively expensive, the final film is more difficult to heat seal, and the waste film cannot be readily reprocessed. A means to differentiate the irradiated polyethylene from that which has not been irradiated, is the xylene solubility test. The term "solubility in xylene" refers to solubility in xylene boiling at 137° to 140° C. This test is used herein to determine the maximum extent of cross-linking in the film as extruded, and, therefore, the fusibility and heat sealability. Since irradiation of the thermoplastic material increases the extent of cross-linking, the solubility in xylene test serves as an indication of the absence of significant irradiation.

There is a continuing need in areas of various packaging applications for tough ethylene polymer films which shrink when heated to snugly enclose the article to be packaged while conforming to the shape of the article.

Surprisingly, modified ethylene polymer compositions containing up to about 95% by weight of an inorganic salt of a carboxyl containing olefin polymer have been found to be readily susceptible to biaxial orientation and when so oriented to be shrinkable when heated and to be tougher than the ethylene polymers alone as evinced by higher tensile strength and secant modulus and lower tensile elongation.

This startling and unexpected improvement can be imparted to low density homopolymers of ethylene as well as to interpolymers of ethylene and olefinically unsaturated comonomers interpolymerized therein by catalytic high pressure polymerization processes which are generally recognized to yield highly branched polymer molecules which tend to orient and crystallize less readily than more linear polymer molecules. Examples of such olefinically unsaturated comonomers include: monoolefins such as propylene, butenes, pentenes, hexenes, heptenes, octenes, dodecenes, octadecenes and the like; diolefins such as butadiene, isoprene, hexadiene, octadiene, decadiene and the like; acetylene; other olefinically unsaturated comonomers such as vinyl formate, vinyl acetate, vinyl propionate, vinyl butyrate, vinyl 2,4-dimethylpentoate, vinyl pelargonate, vinyl stearate, vinyl pivalate, vinyl tert-butyl acetate, vinyl benzoate, vinyl diethylacetate, vinyl beta, gamma-dimethyl valerate, vinyl thioacetate, vinyl alcohol, styrene, methylstyrenes, chlorostyrenes, alkyl monoesters of 2-butene-1,4-dioic acid, diallyl oxalate, diallyl sebacate, methallyl alcohol, allyl alcohol, maleic anhydride, diethyl maleate, diethyl fumarate, diethyl citraconate, 9-methylenefluorene, beta-methylene-beta-propiolactone, vinyl isocoumarans such as 1,1,3,3-tetramethyl-4-vinylisocoumaran, 1,2-alkylene oxides, N-n-butylmaleimide, N-isobutylmaleimide, N-vinylphthalimide, N-methyl-N-vinyl acetamide, vinyl triethoxysilane, bicycloheptene, bicycloheptadiene, divinyl phosphonate, N-vinylcarbazole, methyl acrylate, ethyl acrylate, butyl acrylate, n-octyl acrylate, 2-ethylhexyl acrylate, decyl acrylate, lauryl acrylate, hexadecyl acrylate, ocetadecyl acrylate, methyl methacrylate, ethyl methacrylate, butyl methacrylate, octyl methacrylate, 2-ethylhexyl methacrylate, decyl methacrylate, lauryl methacrylate, tetradecyl methacrylate, hexadecyl methacrylate, octadecyl methacrylate, acrylic acid, methacrylic acid, methyl vinyl ether, ethyl vinyl ether, n-butyl vinyl ether, isobutyl vinyl ether, t-butyl vinyl ether, divinyl ether, vinyl methyl ketone, vinyl ethyl ketone, vinyl butyl ketone, terpenes, bicyclo(2.2.1)-2-heptenes, stilbene, limonene, dichloroethylene, vinyl chloride, vinyl fluoride, vinylidene chloride, vinylidene fluoride and the like; and miscellaneous compounds such as carbon monoxide, formaldehyde, sulfur dioxide and the like.

The inorganic salts of carboxyl acid containing olefin polymer which impart these unexpected improvements to ethylene polymer compositions can contain monovalent, bivalent or trivalent cations with the moieties consisting of carboxyl anion and inorganic cation comprising about 0.5 to 50 mole percent of the total olefin polymer. These polymer salts can be prepared by reacting the starting carboxyl containing olefin polymer with metal salts such as carbonates or bicarbonates, metal bases such as hydroxides or alkoxides, metal alkyls such as sodium ethyl, butyl lithium and the like, metal aryls such as phenyl lithium, potassium naphthalene and the like, hydrides of sodium, potassium or lithium, amides of sodium or potassium, oxides such as sodium peroxide, or in the case of alkali metal salts even with the free alkali metal itself.

The starting carboxyl containing olefin polymers themselves can be prepared from α-olefin homopolymers or interpolymers.

Although not essential, it is preferred to employ as the carboxyl containing α-olefin interpolymers of this invention α-olefins having the general formula:

where R is selected from the group consisting of hydrogen and alkyl radicals having up to 10 carbon atoms, the olefin content of said interpolymer being at least 50 mole percent of the total interpolymer and interpolymerized therewith an α, β-ethylenically unsaturated carboxylic acid having up to 2 carboxylic acid groups.

However, the present invention is not limited to interpolymers derived from the interpolymerization of an α-olefin and an α,β-ethylenically unsaturated carboxylic acid. The starting polymer used to make the inorganic polymer salts used in the invention can also be provided by oxidizing olefinic polymers, such as those described in U.S. 3,155,644, or by grafting carboxylic acid containing monomers onto an olefin polymer backbone by methods well known in the graft polymerization art which are incorporated herein by reference or by grafting monomers such as carboxylic acid derivatives, i.e., esters, anhydrides, amides, nitriles and the like onto an olefin polymer backbone followed by conversion to free carboxylic acid groups after grafting.

Also included within the purview of this invention are halogenated, carboxyl containing α-olefin polymers. The method of introducing the halogen into these polymers is not at all critical and so can be accomplished by first preparing a halogen free interpolymer of, for example, ethylene-acrylic acid and then halogenating that interpolymer by methods well known in the art or by interpolymerizing a halogen containing vinyl monomer with an α-olefin and an unsaturated carboxylic acid. A specific example of this latter class of interpolymers is one obtained by itnerpolymerizing ethylene, vinyl chloride and acrylic acid. Other examples include interpolymers of ethylene-vinylidene chloride-acrylic acid, ethylene-vinyl chloride-methacrylic acid, ethylene-vinylidene chloride-methacrylic acid, ethylene - vinyl bromide - acrylic acid, ethylene-vinyl bromide-methacrylic acid, ethylene-vinyl fluoride-acrylic acid, ethylene-vinyl fluoride-methacrylic acid, ethylene-vinylidene fluoride-acrylic acid, ethylene-vinylidene fluoride-methacrylic acid, ethylene-vinyl iodide-acrylic acid, propylene-vinyl chloride-acrylic acid, propylene, vinyl chloride - methacrylic acid, propylene - vinylidene chloride-acrylic acid, propylene-vinylidene chloride-methacrylic acid and the like and mixtures thereof.

As indicated above, the α-olefins preferably employed in the interpolymers of this invention are α-olefins having the general formula:

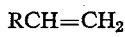

where R is either a hydrogen or an alkyl radical having up to 10 carbon atoms. Thus, suitable α-olefins include, ethylene, propylene, butene-1, pentene-1, hexene-1, neohexene, octene-1, nonene-1, decene-1, 3-methylbutene-1, 4-methylpentene-1, 3-methylhexene-1, 4,4 - dimethylhexene-1 and the like. Although polymers of higher olefins can be used, they are not as commercially available or economical as the lower olefins.

The α,β-ethylenically unsaturated carboxylic acids used in the interpolymers of this invention preferably have 3 to 8 carbon atoms, although those having a greater number of carbon atoms can also be used, if desired. Specific examples include: acrylic acid, methacrylic acid, ethacrylic acid, itaconic acid, maleic acid, fumaric acid, and half esters of the above dicarboxylic acids such as, methyl hydrogen maleate, methyl hydrogen fumarate, ethyl hydrogen maleate, ethyl hydrogen fumarate and the like.

The starting interpolymers used to make the inorganic salts of this invention are not limited to two components. Therefore, additional copolymerizable monomers can be employed together with the olefin and carboxylic acid comonomers. The scope of the starting interpolymers which can be used is exemplified, although not limited by the following interpolymers; ethylene/acrylic acid interpolymers, ethylene methacrylic acid interpolymers, ethylene/itaconic acid interpolymers, ethylene/methyl hydrogen maleate interpolymers, ethylene/maleic acid interpolymers, ethylene/acrylic acid/methyl acrylate interpolymers, ethylene/acrylic acid/ethyl acrylate interpolymers, ethylene/methacrylic acid/methyl methacrylate interpolymers, ethylene/methacrylic acid/ethyl methacrylate interpolymers, ethylene/acrylic acid/methacrylic acid interpolymers, ethylene/methacrylic acid/methyl acrylate interpolymers, ethylene/acrylic acid/methyl methacrylate interpolymers, ethylene/methyl hydrogen maleate/ethyl acrylate interpolymers, ethylene/acrylic acid/vinyl acetate, ethylene/methacrylic acid/vinyl acetate interpolymers, ethylene/propylene/acrylic acid interpolymers, ethylene/propylene/methacrylic acid interpolymers, ethylene/maleic acid/ethyl vinyl ether interpolymers, ethylene/butene-1/acrylic acid interpolymers, ethylene/neohexene/acrylic acid interpolymers, propylene/acrylic acid interpolymers, butene-1/acrylic acid interpolymers and the like.

The ethylene polymer compositions of this invention can be prepared by blending the olefin polymer and carboxyl containing olefin polymer inorganic salt in conventional mixing apparatus well known in the art such as a Banbury mixer, roll mill, twin screw compounding extruder and the like.

The blending temperature is not critical but should be below the decomposition points of the components, and above their softening or melting points.

The apparatus suitable for preparing biaxially oriented films of the olefin polymer compositions claimed are well known and conventionally used by film manufacturers. Thus, biaxial stretching of tubing with compressed gases, tubular orientation, or flat film stretchers employing tenter frames can be used.

Another tubular film process which can be useful is one in which a high blow ratio is used (3:1 to 6:1) in combination with rapid cooling of the extrudate and low die temperatures that is, less than 300° F., the melt being expanded and stretched directly upon leaving the die. The polymer films used in demonstrating this invention were made by a tubular orientation or "double bubble" process. In the "double-bubble" method for biaxially orienting thermoplastic polymer films, a primary tubing is first formed by melt extrusion from a die, inflated by the admission of air, cooled, collapsed, and then reinflated to form an isolated bubble and the tubing is advanced through a heating zone to raise the film to its draw temperature but below the crystalline melting point of the thermoplastic polymer. Since the unmodified olefin polymers cannot be continuously biaxially stretched or oriented, blown films of these materials were used as controls. Blown film (relatively non-oriented) was prepared in a conventional manner using a tubular die at 350 to 450° F., low stretch ratios (2 to 3X) and normal take off speeds.

The toughness of both the unmodified olefin polymers and the modified olefin polymer compositions was determined by measuring tensile strength (ASTM D–882–56T), percent elongation (ASTM D–882–56T), and secant modulus (ASTM D–882) of the respective polymer films.

The percent unrestrained shrinkage of the respective polymer films was measured at 80° C., 90° C., 100° C., and 110° C., using a glycerine bath, temperature controlled within ±1° C. Measurements were made upon specimens taken from both the machine and transverse direction of the film.

The olefin polymers used in this invention should be a grade suitable for film forming having a density in grams per cubic centimeter of about 0.88 to 0.97 and be readily extrudable. It is preferred to use olefin polymers having a density of about 0.91 to 0.94 and a melt index of 0.5 to 10 decigrams per minute.

The carboxylic acid moiety content of the starting carboxylic acid containing olefin polymer is preferably in the range of about 2 to 25 mole percent of the total olefin polymer although contents of about 0.5 to 50 mole percent can also be employed if desired. For most purposes the melt index of these starting polymers should be in the range of about 0.01 dg./min. to about 1000 dg./min. as determined by ASTM D–1238–62T (condition E).

The carboxylic acid salt moiety content of the olefin polymer salts used in this invention is preferably in the range of about 3 to 30 mole percent of the total olefin polymer, although other contents can be used if desired. The term "carboxylic acid salt moiety" includes both the carboxylic acid anion and the inorganic cation.

The preferred inorganic cations are monovalent such as $NH_4^+$ and those derived from alkali metals, viz., Na, K, Li, Cs and the like. However, divalent and trivalent cations as well as other monovalent cations can also be used if desired as, for example, those derived from elements in Groups I, II, III, IVA and VIII of the Deming Periodic Table found on pages 338–339 of the Handbook of Chemistry and Physics Chemical Rubber Publishing Co., 34th Edition. Thus, other suitable monovalent cations are $Cu^+$, $Ag^+$ and $Hg^+$. Suitable divalent cations include $Be^{++}$, $Mg^{++}$, $Ca^{++}$, $Sr^{++}$, $Ba^{++}$, $Cu^{++}$, $Hg^{++}$, $Sn^{++}$, $Pb^{++}$, $Ni^{++}$, $Fe^{++}$, $Co^{++}$, $Ni^{++}$ and $Zn^{++}$. Suitable trivalent cations include $Al^{+++}$, $Fe^{+++}$ and $Sc^{+++}$.

The polymer salts used in this invention derived from a starting interpolymer need not be limited to 2 components, i.e., one α-olefin and one carboxylic acid salt moiety, either. Even when the starting polymer is composed of only 2 components, viz., one α-olefin and one carboxylic acid, the resultant salt can have 3 or more components. To cite a concrete case in point, an ethylene/acrylic acid interpolymer can be partly neutralized with sodium hydroxide to afford an interpolymer salt consisting of 3 components, viz., ethylene, acrylic acid, and sodium acrylate mers. It will be readily apparent to those skilled in the art that polymer salts containing innumerable combinations of α-olefins and unsaturated carboxylic acids, salts and acid derivatives are contemplated within the purview of this invention.

The invention is further described by the examples which follow in which all parts and percentages are by weight unless otherwise specified.

EXAMPLE 1

Polyethylene having a density of 0.929 g./cc. and a melt index of 1.9 dg./min. was blended in a 75:25 ratio in a Banbury mixer at 150° C. for 20 minutes with an ethylene/acrylic acid/sodium acrylate interpolymer prepared by sodium hydroxide neutralization of 30% of the carboxyl groups of an ethylene/acrylic acid interpolymer having a melt index of 50 and 15% acrylic acid polymerized therein. A tube of this blended composition, 0.476 mm. or 0.018 inch thick was prepared by melt extrusion using a one inch diameter die maintained at 193° C., the tubing being cooled with an air stream and flattened through a pair of pinch rollers rotating at 2.5 feet per minute and then continuously biaxially oriented by passing the tubing through a cylindrical infrared heater free of contact with the walls of the heater, heating to a temperature below its melting point and expanding the tubing with compressed air 4.5 times in diameter while applying a longitudinal stretch of 5.2 times by a second pair of pinch rollers rotating at 13 feet per minute.

The improvement in tensile strength, percent elongation, secant modulus and unrestrained shrinkage at 80° C., 90° C., 100° C., and 110° C., was demonstrated by comparison with a Control consisting of unmodified polyethylene (0.929 g./cc. density and 1.9 dg./min. melt index). The control film was blown and could not be biaxially oriented. The pertinent data are delineated in Table I. The non-oriented blown film was prepared by inflating the molten polymer 2.5 times the 1 inch die diameter as it emerged from a tubular die at 193° C. and flattening the bubble by a pair of pinch rollers rotating at 8 feet per minute.

EXAMPLE 2

The procedure described in Example 1 was followed except that polyethylene having a melt index of 2.1 dg./min. and a density of 0.922 g./cc. was used for both Control and in the blended composition with the ethylene/acrylic acid/sodium acrylate terpolymer. Data showing improvement in physical properties over that of the Control is also contained in Table I.

EXAMPLE 3

The procedure described in Example 1 was followed except that an ethylene/vinyl acetate (80/20) copolymer having a melt index of 2.0 dg./min. was used for both Control and in the blended composition with the ethylene/acrylic acid/sodium acrylate terpolymer. Data showing improvement in physical properties over that of the Control is also presented in Table I.

EXAMPLES 4–7

The procedure described in Example 1 was followed except that an ethylene/vinyl acetate (96.5/3.5) copolymer having a melt index of 0.4 dg./min. was used for both Control and in blended compositions containing 10%, 25%, 50%, and 75% of the ethylene/acrylic acid/sodium acrylate terpolymer. Relative data showing the enhancement in physical properties of the blended compositions over that of the Control are presented in Table I.

TABLE I.—Film Properties of Polyethylene—Ethylene/Acrylic Acid Salt Mixtures and Ethylene/Vinyl Acetate Copolymer—Ethylene/Acrylic Acid Salt Mixtures

| Example No. | Ethylene Polymer Concentration, percent | Polymer Salt Concentration [2] | Tensile Strength, ×10⁻³ p.s.i. | Elongation, percent | Secant Modulus, ×10⁻³ p.s.i. | Unrestrained Shrinkage, percent | | | |
|---|---|---|---|---|---|---|---|---|---|
| | | | | | | 80° C. | 90° C. | 100° C. | 110° C. |
| 1 | [1] 100 | Control | [a] 3.00/3.61 | [a] 376/468 | [a] 33.9/31.1 | [a] 0.4/0.3 | | [a] 2.6/3.5 | |
| | [1] 75 | 25% | 4.84/5.31 | 140/94 | 40.3/45.5 | 2/12 | [a] 18/24 | 21/29 | [a] 61/61 |
| 2 | [3] 100 | Control | 2.67/2.38 | 352/482 | 21.0/20.8 | 0.2/0.3 | | 0.3/1.0 | |
| | [3] 75 | 25% | 2.88/3.540 | 134/138 | 40.4/42.3 | 3/5 | 3/10 | 9.21 | 23/40 |
| 3 | [4] 100 | Control | 4.2/4.0 | 550/670 | 8.2/8.2 | | | | |
| | [4] 75 | 25% | 1.61/2.46 | 162/178 | 101.7/74.4 | | | | |
| 4 | [5] 100 | Control | 2.75/2.25 | 176/392 | 15.5/17.0 | 0.6/0.1 | | 1.4/1.2 | |
| | [5] 90 | 10% | 2.53/3.04 | 210/214 | 18.8/14.6 | | | | |
| 5 | [5] 75 | 25% | 5.00/4.59 | 158/138 | 35.2/32.4 | 11/17 | 20/31 | 30/15 | |
| 6 | [5] 50 | 50% | 5.35/6.53 | 120/72 | 39.0/43.7 | 6/14 | 22/34 | 30/41 | |
| 7 | [5] 25 | 75% | 9.85/9.32 | 84/48 | 53/8/61.1 | | | | |

[1] Polyethylene, melt index = 1.9 dg./min., density = 0.929.
[2] Ethylene/acrylic acid copolymer, 50 M.I., 15% AA, 30% converted to the sodium salt.
[3] Polyethylene, melt index = 2.1 dg./min. density = 0.922.
[4] Ethylene/vinyl acetate (80/20) copolymer, melt index = 2.0 dg./min.
[5] Ethylene/vinyl acetate (96.5/3.5) copolymer, melt index = 0.4 dg./min.
[a] Data obtained in machine direction/transverse direction.

EXAMPLES 8–9

An ethylene/methacrylic acid/sodium acrylate or methacrylate interpolymer when substituted for the ethylene/acrylic acid/sodium acrylate interpolymer of Examples 1–7 gives similar results.

EXAMPLES 10–18

When ethylene/acrylic acid or ethylene methacrylic acid/potassium, lithium or ammonium acrylate or methacrylic interpolymers are employed in place of the ethylene/acrylic acid/sodium acrylate interpolymers and the procedures described in Examples 1–7 are followed similar improvements over the Controls are obtained.

EXAMPLE 19

The use of a propylene/acrylic acid/sodium acrylate interpolymer in place of the ethylene/acrylic acid/sodium acrylate interpolymer of Examples 1–7 affords similar results.

The films made by biaxially orienting the compositions of this invention can be used to package turkeys, red meat and produce such as fresh fruits and vegetables.

EXAMPLES 20–21

Two commercially available polyethylenes, Alathon PE–413 and Alathon 14 (both sold by Du Pont Co., Inc.) having densities of 0.915 g./cc. and 0.914 g./cc. and melt indices of 1.45 and 2.4 respectively, were found to be very difficult to inflate and orient by the techniques described until blended with the polymer salts of this invention.

EXAMPLE 22

Twenty parts of an 85/15 ethylene/acrylic acid copolymer having a melt index of 50 dg./min. was dry blended with 80 parts of a 76.3/6.7/17.0 ethylene/acrylic acid/sodium acrylate interpolymer having a melt index of 0.3 dg./min. and the resultant blend extruded at 193° C. using a 1 inch extruder and tubular die. Biaxial orientation of the extruded tube was accomplished using pinch rollers at speeds of 2.5 and 14 r.p.m. to achieve a longitudinal stretch of 5.6 times and a transverse stretch of 4.4 times by blowing air into the tube while positioned between the two pinch rollers.

The biaxially oriented blend of ethylene/acrylic copolymer and ethylene/acrylic acid/sodium acrylate interpolymer exhibited the following physical properties:

Tensile strength _____ p.s.i._ 3,920/6,200
Elongation _____ pct__ 58/65
Secant modulus _____ p.s.i._ 60,900/71,200
Shrinkage at 80° C. _____ pct__ 43/41
Shrinkage at 100° C. _____ pct__ 60/58

As a Control, the same ethylene/acrylic acid copolymer used above extruded alone could not be biaxially oriented as was the blend.

EXAMPLE 23

Fifty parts of a 96.5/3.5 ethylene/vinyl acetate copolymer having a melt index of 0.4 dg./min. was dry blended with 50 parts of an 88.4/2.2/9.4 ethylene/methacrylic acid/sodium methacrylate interpolymer having a melt index of 1.6 dg./min., compounded in a mixing extruder and pelletized. The blend was then extruded at 193° C. using a 1 inch extruder and tubular die. Biaxial orientation of the extruded tube was accomplished using pinch rollers at speeds of 2.5 and 12 r.p.m. to achieve a longitudinal stretch of 5.3 times and a transverse stretch, by expanding a bubble formed between the two rollers with air, of 4.8 times.

The biaxially oriented blend of ethylene/vinyl acetate copolymer and ethylene/methacrylic acid/sodium methacrylate interpolymer exhibited the following physical properties:

Tensile strength _____ p.s.i._ 6900/9900
Elongation _____ pct__ 96/95
Shrinkage at 90° C. _____ pct__ 22/28

As a control the same ethylene/vinyl acetate copolymer used above was extruded alone but could not be biaxially oriented as was the blend.

EXAMPLES 24–28

The procedure described in Example 23 was followed with the following compositions:

(24) 75 parts 96.5/3.5 ethylene/vinyl acetate copolymer having a melt index of 0.4 dg./min.:25 parts 88.4/2.2/9.4 ethylene/methacrylic acid/sodium methacrylate interpolymer having a melt index of 1.6 dg./min.

(25) 60 parts of 82/18 ethylene/ethyl acrylate copolymer having a melt index of 6.0 dg./min.: 40 parts of 88.4/2.2/9.4 ethylene/methacrylic acid/sodium methacrylate interpolymer having a melt index of 1.6 dg./min.

(26) 75 parts of 93/7 ethylene/acrylic acid having a melt index of 7.0 dg./min.: 25 parts of 77/3/21.0 ethylene/acrylic acid/sodium acrylate interpolymer having a melt index of 2.3 dg./min.

(27) 75 parts of 96.5/3.5 ethylene/vinyl acetate copolymer having a melt index of 0.4 dg./min.: 25 parts of 84.6/7.6/7.8 ethylene/acrylic acid/potassium acrylate interpolymer having a melt index of 1.4 dg./min.

(28) 75 parts of 96.5/3.5 ethylene/vinyl acetate copolymer having a melt index of 0.4 dg./min.: 25 parts of 85.5/7.6/6.9 ethylene/acrylic acid/calcium acrylate interpolymer having a melt index of 1.5 dg./min.

The resultant mixtures in all of these examples could be biaxially oriented and shrunk and had physical properties similar to those described in the previous examples as shown in Table II.

TABLE II [a]

| Example | Tensile Strength, p.s.i. | Elongation, Percent | Unrestricted Shrinkage at 90° C. |
| --- | --- | --- | --- |
| 24 | 5,600/10,400 | 108/126 | 18/26 |
| 25 | 4,480/3,833 | 110/114 | 15/46 |
| 26 | 11,400/11,800 | 94/82 | 22/29 |
| 27 | 7,200/7,700 | 114/214 | 17/19 |
| 28 | 4,200/5,900 | 92/112 | 16/11 |

[a] Data obtained in machine direction/transverse direction.

Shrinkage was determined by immersing, for 5 seconds, a marked length of a one inch wide strip of film into a bath maintained at the indicated temperature. The film was held at one end with a clip and the other end was free. The values are in percentage of original sample tested.

All ethylene polymers of the present invention whose susceptibility to biaxial orientation has been improved are completely soluble in xylene boiling at 137° C. to 140° C.

Although the invention has been described in its preferred forms with a certain degree of particularity, it is understood that the present disclosure has been made only by way of example, and that numerous changes can be made without departing from the spirit and scope of the invention.

What is claimed is:

1. Biaxially orientable compositions comprising a blend of:
   (1) an ethylene polymer, soluble in xylene, boiling at 137° C. to 140° C., having a density of about 0.91 to 0.94 and melt index of about 0.1 to 20 decigrams/minute, selected from the group consisting of polyethylene, ethylene/vinyl acetate interpolymer containing up to 20% by weight of vinyl acetate interpolymerized therein, ethylene/acrylic acid interpolymer containing up to about 15% by weight of acrylic acid interpolymerized therein and ethylene/alkyl acrylate interpolymer containing up to about 18% by weight of alkyl acrylate interpolymerized therein; and (2) an effective amount up to about 95% by weight of interpolymer a monovalent inorganic salt consisting essentially of an $\alpha,\beta$-ethylenically unsaturated carboxylic acid and an $\alpha$-monoolefin, wherein said interpolymer has a carboxylic acid salt moiety content of about 3 to 30 mole percent.

2. Composition claimed in claim 1 wherein the inorganic salt is an alkali metal salt of an ethylene/acrylic acid interpolymer.

3. Composition claimed in claim 1 wherein the inorganic salt is an ammonium salt of an ethylene/methacrylic acid interpolymer.

4. A biaxially oriented film of the composition claimed in claim 1.

5. A biaxially oriented film of the composition claimed in claim 2.

6. The composition claimed in claim 2 wherein the alkali metal is sodium.

7. A biaxially oriented film of the composition claimed in claim 6.

8. The composition claimed in claim 1 wherein the ethylene polymer is polyethylene.

9. The composition claimed in claim 1 wherein the olefin polymer is an ethylene/vinyl acetate interpolymer.

10. The composition claimed in claim 1 wherein the olefin polymer is an ethylene/acrylic acid interpolymer.

References Cited

UNITED STATES PATENTS

| | | | |
|---|---|---|---|
| 2,880,186 | 3/1959 | Barth | 260—5 |
| 2,953,541 | 9/1960 | Pecha et al. | 260—897 |
| 3,026,281 | 3/1962 | Harren et al. | 260—897 |
| 3,035,011 | 5/1962 | Bartl et al. | 260—897 |
| 3,127,234 | 3/1964 | O'Neill | 260—897 |
| 3,248,359 | 4/1966 | Maloney | 260—897 |
| 3,249,570 | 5/1966 | Potts et al. | 260—897 |

MURRAY TILLMAN, *Primary Examiner.*

T. G. FIELD, Jr., *Assistant Examiner.*

UNITED STATES PATENT OFFICE
CERTIFICATE OF CORRECTION

Patent No. 3,365,520                           January 23, 1968

George N. Foster et al.

It is hereby certified that error appears in the above numbered patent requiring correction and that the said Letters Patent should read as corrected below.

Column 9, lines 6 to 9, for "interpolymer a monovalent inorganic salt consisting essentially of an α,β-ethylenically unsaturated carboxylic acid and an α-monoolefin wherein said interpolymer" read -- a monovalent inorganic salt of an interpolymer consisting essentially of an α,β-ethylenically unsaturated carboxylic acid and an α-monoolefin wherein said inorganic salt --.

Signed and sealed this 25th day of March 1969.

(SEAL)
Attest:

Edward M. Fletcher, Jr.                        EDWARD J. BRENNER

Attesting Officer                              Commissioner of Patents